US008746185B2

(12) United States Patent
Teraya (10) Patent No.: US 8,746,185 B2
(45) Date of Patent: Jun. 10, 2014

(54) ENGINE CONTROL DEVICE AND ENGINE CONTROL METHOD

(75) Inventor: Ryuta Teraya, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/807,488

(22) PCT Filed: Sep. 8, 2010

(86) PCT No.: PCT/JP2010/065382
§ 371 (c)(1),
(2), (4) Date: Dec. 28, 2012

(87) PCT Pub. No.: WO2012/032614
PCT Pub. Date: Mar. 15, 2012

(65) Prior Publication Data
US 2013/0239910 A1 Sep. 19, 2013

(51) Int. Cl.
*F01P 7/16* (2006.01)
(52) U.S. Cl.
CPC ...................................... *F01P 7/164* (2013.01)
USPC .................. 123/41.02; 123/41.05; 123/41.44; 701/113
(58) Field of Classification Search
CPC ................ F01P 7/164; F01P 7/14; F01P 7/16
USPC ........ 123/41.02, 41.01, 41.44, 41.05; 701/36, 701/113
See application file for complete search history.

(56) References Cited

U.S. PATENT DOCUMENTS

| | | | | |
|---|---|---|---|---|
| 5,701,852 A | * | 12/1997 | Suzuki et al. | 123/41.14 |
| 5,896,833 A | * | 4/1999 | Aoki | 123/41.14 |
| 6,082,626 A | * | 7/2000 | Morikawa et al. | 237/12.3 B |
| 6,243,642 B1 | * | 6/2001 | Thomas | 701/113 |
| 6,571,752 B1 | * | 6/2003 | Suzuki | 123/41.14 |
| 8,408,168 B2 | * | 4/2013 | Suzuki et al. | 123/41.44 |
| 2005/0228571 A1 | * | 10/2005 | Odeskog et al. | 701/103 |
| 2006/0005789 A1 | * | 1/2006 | Miura et al. | 123/41.1 |
| 2006/0213461 A1 | * | 9/2006 | Hayami | 123/41.15 |
| 2007/0028862 A1 | * | 2/2007 | Braun et al. | 123/41.1 |
| 2009/0205588 A1 | * | 8/2009 | Bilezikjian et al. | 123/41.02 |
| 2009/0229543 A1 | * | 9/2009 | Suzuki | 123/41.02 |
| 2010/0083916 A1 | * | 4/2010 | Shintani et al. | 123/41.1 |
| 2010/0122671 A1 | * | 5/2010 | Lee | 123/41.1 |

FOREIGN PATENT DOCUMENTS

| | | |
|---|---|---|
| JP | A-2004-316472 | 11/2004 |
| JP | A-2006-161739 | 6/2006 |
| JP | A-2006-161742 | 6/2006 |
| JP | A-2006-161745 | 6/2006 |
| JP | A-2008-169748 | 7/2008 |
| JP | A-2009-197641 | 9/2009 |
| JP | A-2010-180713 | 8/2010 |

* cited by examiner

*Primary Examiner* — Noah Kamen
*Assistant Examiner* — Grant Moubry
(74) *Attorney, Agent, or Firm* — Oliff PLC (57) ABSTRACT

A control device is provided for an engine equipped with an electric oil pump for circulating coolant, and having a flow rate of the coolant restricted, when a temperature of the coolant is lower than a threshold value, as compared to a case where the temperature of the coolant is equal to or higher than the threshold value, and the engine control device includes a coolant temperature sensor detecting a temperature of the coolant, and a control unit stopping the engine in accordance with the temperature to be detected by the coolant temperature sensor after the pump is driven so as to increase the flow rate of the coolant, in a case where the flow rate of the coolant is restricted.

4 Claims, 7 Drawing Sheets

ENGINE CONTROL DEVICE AND ENGINE CONTROL METHOD

TECHNICAL FIELD

The present invention relates to a control device and control method for an engine, and more particularly to a technique of driving a pump for circulating engine coolant.

BACKGROUND ART

A vehicle having an engine is known. Many engines are cooled by using coolant. Coolant is circulated by a water pump. For example, an electric water pump is used. When the temperature of coolant is higher than a threshold value, coolant is circulated by an electric water pump to cool an engine. On the other hand, when the temperature of coolant is lower than a threshold value, the electric water pump is stopped to facilitate engine warm-up.

The temperature of coolant is leveraged for controlling an electric water pump and also for performing various controls for an engine. However, in a state where the electric water pump is stopped, the difference between the temperature at a location where a coolant temperature sensor is provided and the temperature at a location remote from the coolant temperature sensor may become large. For example, there may be a case where the temperature at a location away from a coolant temperature sensor is low even though the temperature detected by the coolant temperature sensor is high. In such a case, the overall temperature (for example, the average temperature) of coolant can be said to be low. To minimize such a difference, it is preferable that an electric water pump is driven for a predetermined period of time, as disclosed in the fourth paragraph of Japanese Patent Laying-Open No. 2008-169748.

CITATION LIST

Patent Literature

PTL 1: Japanese Patent Laying-Open No. 2008-169748

SUMMARY OF INVENTION

Technical Problem

Also in a hybrid vehicle having an engine and an electric motor, coolant and a water pump (for example, an electric water pump) are used for cooling an engine. For example, in a case where a hybrid vehicle travels by using only an electric motor, the engine is stopped since it is not necessary to drive the engine. Taking in account the start-up performance (such as fuel volatility) at the time of restarting the engine, the engine is allowed to stop when the temperature of coolant is higher than a predetermined permission temperature.

In a case where the temperature of coolant is not uniform, there may be a location where the temperature is lower than the temperature detected by a coolant temperature sensor even though the temperature detected by the coolant temperature sensor is higher than the permission temperature. In a case where the temperature is partially low, the overall temperature may be low even though the temperature detected by the coolant temperature sensor is high. Thus, if an engine is stopped in such a state, the start-up performance at the time of restarting the engine may be deteriorated.

However, the art disclosed in Japanese Patent Laying-Open No. 2008-169748 was not aimed to solve such a problem of an engine. Thus, the art disclosed in Japanese Patent Laying-Open No. 2008-169748 did not take in account the start-up performance of an engine.

An object of the present invention is to prevent deterioration of the engine start-up performance.

Solution to Problem

A control device for an engine equipped with a pump that circulates coolant, and having a flow rate of the coolant restricted, when a temperature of the coolant is lower than a threshold value, as compared to a case where the temperature of the coolant is equal to or higher than the threshold value includes a coolant temperature sensor that detects a temperature of the coolant, and a control unit that stops the engine in accordance with the temperature detected by the coolant temperature sensor after the pump is driven so as to increase the flow rate of the coolant, in a case where the flow rate of the coolant is restricted.

A control method for an engine equipped with a pump that circulates coolant, and having a flow rate of the coolant restricted, when a temperature of the coolant is lower than a threshold value, as compare to a case where the temperature of the coolant is equal to or higher than the threshold value includes the steps of detecting a temperature of the cooling water, and stopping the engine in accordance with the temperature detected by the coolant temperature sensor after the pump is driven so as to increase the flow rate of the coolant, in a case where the flow rate of the coolant is restricted.

A control device for an engine equipped with a pump that circulates coolant, and having a flow rate of the coolant restricted, when a temperature of the coolant is lower than a threshold value, as compared to a case where the temperature of the coolant is equal to or higher than the threshold value includes means for detecting a temperature of coolant, and means for stopping the engine in accordance with the temperature detected by the coolant temperature sensor after the pump is driven so as to increase the flow rate of the coolant, in a case where the flow rate of the coolant is restricted.

Advantageous Effects of Invention

Before determining whether or not to stop an engine in accordance with the temperature of coolant, a pump is driven so as to increase the flow rate of coolant. Accordingly, the difference between the temperature at a location where the temperature of coolant is detected and the temperature at other location is minimized, and thereafter determination on whether or not to stop the engine is performed in accordance with the temperature of coolant. Thus, the engine can be stopped after the overall temperature of coolant becomes sufficiently high. Consequently, deterioration of the engine start-up performance can be prevented.

DESCRIPTION OF EMBODIMENTS

Hereinafter, embodiments of the present invention will be described with reference to the drawings. In the description below, the same elements have the same reference characters allotted. They are named and function identically. Therefore, detailed description thereof will not be repeated.

Figure 1:
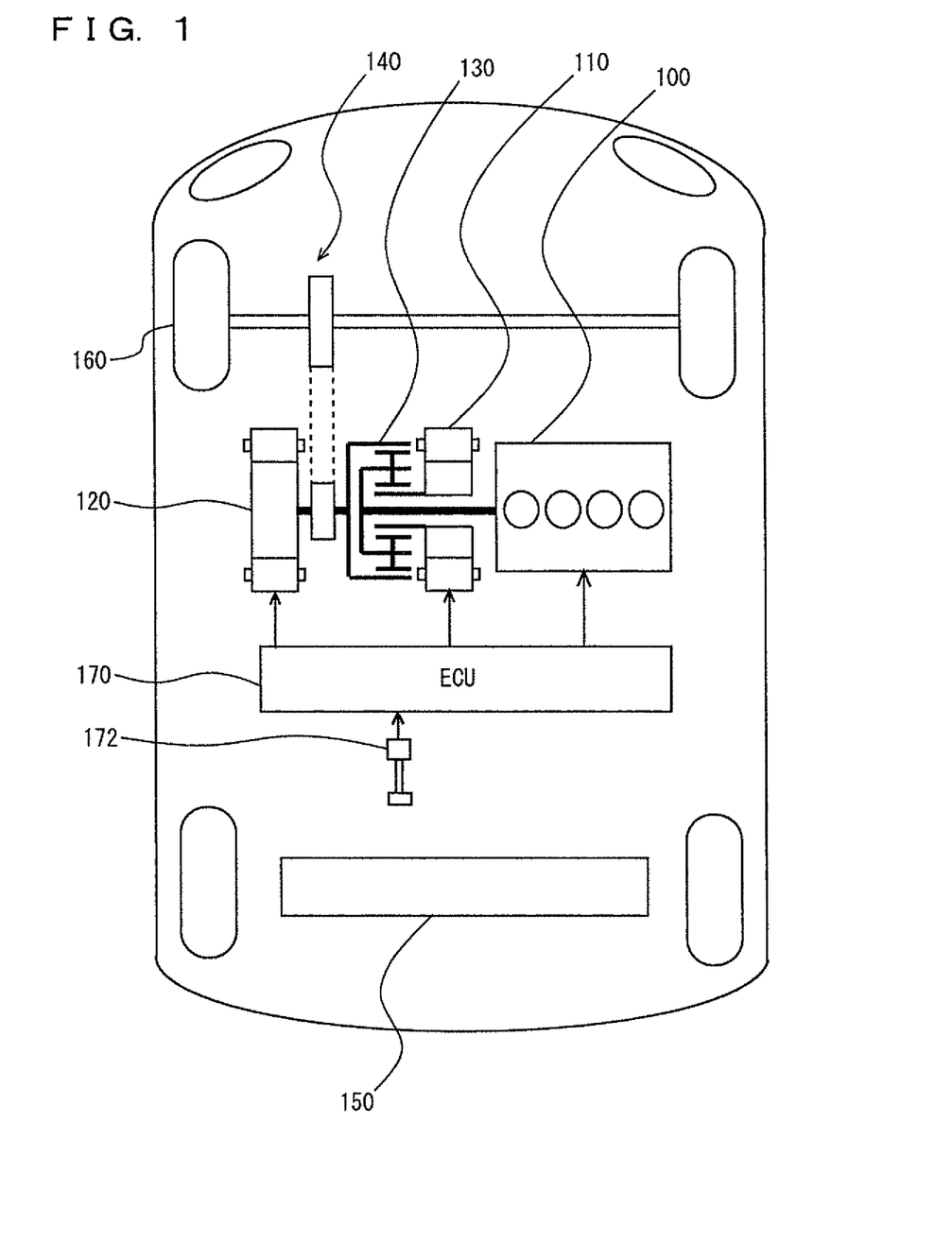
FIG. 1 is a schematic configuration diagram showing a hybrid vehicle.

Referring to FIG. 1, a hybrid vehicle has an engine 100, a first motor generator 110, a second motor generator 120, a power split device 130, a reducer 140, and a battery 150. In the following description, a hybrid vehicle without a function of charging from an external power source will be described as an example. However, a plug-in hybrid vehicle having a function of charging from an external power source may be used.

Engine 100, first motor generator 110, second motor generator 120, and battery 150 are controlled by an ECU (Electronic Control Unit) 170. ECU 170 may divided into a plurality of ECUs.

This vehicle travels with a drive force supplied by at least one of engine 100 and second motor generator 120. In other words, one or both of engine 100 and second motor generator 120 is automatically selected as a driving source in accordance with a driving state.

For example, engine 100 and second motor generator 120 are controlled in accordance with a result of operation to an accelerator pedal 172 by a driver. The operation amount (accelerator position) of accelerator pedal 172 is detected by an accelerator position sensor (not illustrated).

In such cases where the accelerator position is low and where the vehicle speed is low, the hybrid vehicle travels using only second motor generator 120 as a driving source. In this case, engine 100 is stopped. However, there is a case where engine 100 is driven for electric power generation.

Further, in such cases where the accelerator position is high, where the vehicle speed is high, and where the remaining capacitance (SOC: State Of Charge) of battery 150 is small, engine 100 is driven. In this case, the hybrid vehicle travels using only engine 100 or both engine 100 and second motor generator 120 as a driving source.

Engine 100 is an internal combustion engine. Combustion of gas mixture of fuel and air in a combustion chamber allows a crank shaft as an output shaft to be rotated. Engine 100 is cooled using coolant.

Figure 2:
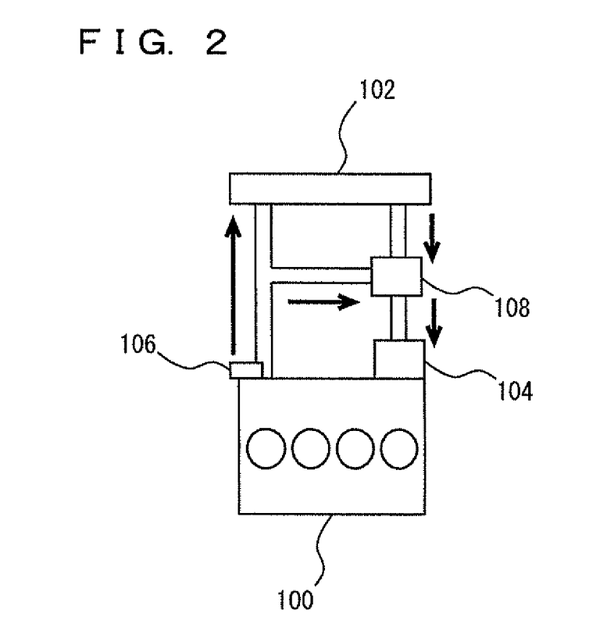
FIG. 2 is a diagram showing an engine cooling system.

Referring to FIG. 2, the coolant for engine 100 is circulated in engine 100 (a cylinder head and a cylinder block) and radiator 102. The coolant is circulated by an electric water pump 104. Instead of using electric water pump 104, a water pump having a clutch may be used. A temperature TW of the coolant is detected by a coolant temperature sensor 106. A signal indicating detected temperature TW is transmitted to ECU 170.

For example, if temperature TW detected by coolant temperature sensor 106 is equal to or greater than a predetermined threshold value TWA, electric water pump 104 is driven to circulate the coolant. Electric water pump 104 is controlled by, for example, ECU 170.

In a case where temperature TW detected by coolant temperature sensor 106 is lower than threshold value TWA, the flow rate of the coolant is restricted as compared to a case where temperature TW detected by coolant temperature sensor 106 is equal to or higher than threshold value TWA. In a case where temperature TW detected by coolant temperature sensor 106 is lower than threshold value TWA, electric water pump 104 is driven, for example, at a minimum duty ratio. In other words, the coolant is circulated at a minimum flow rate. The method of driving electric water pump 104 is not limited to this. Electric water pump 104 may be stopped.

On a flow passage connecting engine 100 and radiator 102, there is provided a thermostat 108. When the temperature of the coolant becomes equal to or higher than a predetermined temperature, thermostat 108 is opened. When thermostat 108 is opened, the coolant is circulated between engine 100 and radiator 102. When the temperature of the coolant becomes lower than the predetermined temperature, thermostat 108 is closed. When thermostat 108 is closed, circulation of the coolant between engine 100 and radiator 102 is prevented.

Referring back to FIG. 1, engine 100, first motor generator 110, and second motor generator 120 are connected through a power split device 130. A power generated by engine 100 is split into two paths by power split device 130. One path is for driving front wheels 160 through reducer 140, and the other path is for driving first motor generator 110 to generate electric power.

First motor generator 110 is a three-phase alternating current rotating electric machine including a U-phase coil, V-phase coil, and a W-phase coil. First motor generator 110 generates electric power using the motive power generated by engine 100 and split by power split device 130. The electric power generated by first motor generator 110 is used in accordance with a traveling state of the vehicle, and a state of charge of battery 150. For example, during normal traveling, the electric power generated by first motor generator 110 is used directly as electric power for driving second motor generator 120. On the other hand, in a case where the SOC of battery 150 is lower than a predetermined value, the electric power generated by first motor generator 110 is converted from alternate current to direct current by an inverter described below. Thereafter, the voltage is adjusted by the converter described below, and then is stored in battery 150.

In a case where first motor generator 110 serves as an electric power generator, first motor generator 110 generates negative torque. Herein, the negative torque refers to torque serving a load for engine 100. In a case where first motor generator 110 is supplied with electric power to serve as a motor, first motor generator 110 generates positive torque. Herein, the positive torque refers to torque not serving as a load for engine 100, in other words, torque assisting rotation of engine 100. This holds true for second motor generator 120.

Second motor generator 120 is a three-phase alternating current rotating electric machine having a U-phase coil, a V-phase coil, and a W-phase coil. Second motor generator 120 is driven using at least one of the electric power stored in battery 150 and the electric power generated by first motor generator 110.

The driving force of second motor generator 120 is transmitted to front wheels 160 through reducer 140. Thus, second motor generator 120 assists engine 100 or causes the vehicle to travel using the driving force provided from second motor generator 120. Instead of or in addition to front wheels 160, rear wheels may be driven.

Upon regenerative braking of the hybrid vehicle, second motor generator 120 is driven by front wheels 160 through reducer 140, and second motor generator 120 operates as a power generator. Thus, second motor generator 120 operates as a regenerative brake converting the braking energy to electric power. The electric power generated by second motor generator 120 is stored in battery 150.

Power split device 130 is constituted of planetary gears including a sun gear, a pinion gear, a carrier, and a ring gear. The pinion gear engages with the sun gear and the ring gear.

The carrier rotatably supports the pinion gear. The sun gear is coupled to a rotating shaft of first motor generator 110. The carrier is coupled to a crank shaft of engine 100. The ring gear is coupled to the rotating shaft of second motor generator 120 and reducer 140.

Engine 100, first motor generator 110, and second motor generator 120 are coupled to one another through power split device 130 constituted by the planetary gear, so that the rotation speed of engine 100, first motor generator 110, and second motor generator 120 are in a relation such that they are connected by a straight line in a monographic chart.

Battery 150 is a battery assembly constituted of a plurality of battery modules connected in series and each integrating a plurality of battery cells. The voltage of battery 150 is, for example, about 200V. Battery 150 is charged with electric power supplied from an external power source of a vehicle, in addition to the electric power supplied from first motor generator 110 and second motor generator 120. Instead of or in addition to battery 150, a capacitor may be used.

Figure 3:
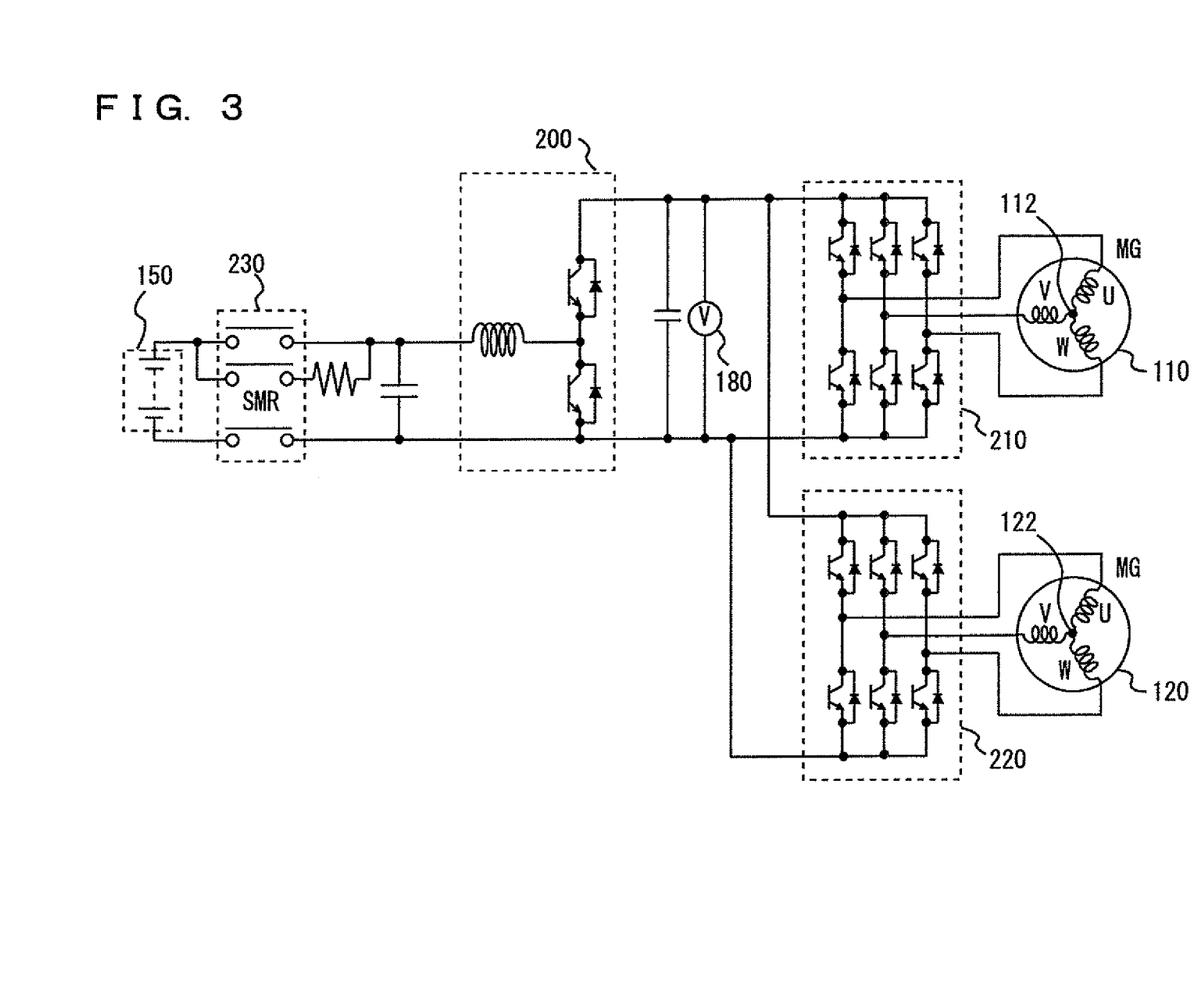
FIG. 3 is a diagram showing an electric system of the hybrid vehicle.

Referring to FIG. 3, an electric system of a hybrid vehicle will be further described. The hybrid vehicle is provided with a converter 200, a first inverter 210, a second inverter 220, and a system main relay 230.

Converter 200 includes a reactor, two npn-type transistors, and two diodes. The reactor has one end connected to a positive electrode side of each battery and the other end connected to a connection point of the two npn-type transistors.

The two npn-type transistors are connected in series. The npn-type transistors are controlled by ECU 170. Between the collector and emitter in each npn-type transistor, a diode is connected to allow a current to flow from the emitter side to the collector side.

As the npn-type transistor, for example, an IGBT (Insulated Gate Bipolar Transistor) can be used. In place of the npn-type transistor, an electric power switching device such as a power MOSFET (Metal Oxide Semiconductor Field-Effect Transistor) can be used.

When the electric power discharged from battery 150 is supplied to first motor generator 110 or second motor generator 120, the voltage is boosted by converter 200. In contrast, when battery 150 is charged with the electric power generated by first motor generator 110 or second motor generator 120, converter 200 down-converts the voltage.

A system voltage VH between converter 200 and each inverter is detected by a voltage sensor 180. The result of detection by voltage sensor 180 is transmitted to the ECU 170.

First inverter 210 includes a U-phase arm, a V-phase arm, and a W-phase arm. The U-phase arm, the V-phase arm, and the W-phase arm are connected in parallel. Each of the U-phase arm, V-phase arm, and W-phase arm has two npn-type transistors connected in series. Between the collector and the emitter of each npn-type transistor, a diode is connected to allow a current to flow from the emitter side to the collector side. Then, a connection point of each npn-type transistor in each arm is connected to an end different from a neutral point 112 in each coil of the first motor generator 110.

First inverter 210 converts a direct current supplied from battery 150 into an alternating current and supplies it to first motor generator 110. Further, first inverter 210 converts an alternating current generated by first motor generator 110 into a direct current.

Second inverter 220 includes a U-phase arm, a V-phase arm, and a W-phase arm. The U-phase arm, the V-phase arm, and the W-phase arm are connected in parallel. Each of the U-phase arm, V-phase arm, and W-phase arm has two npn-type transistors connected in series. Between the collector and the emitter in each npn-type transistor, a diode is connected to allow a current to flow from the emitter side to the collector side. A connection point of each npn-type transistor in each arm is connected to an end portion different from a neutral point 122 of each coil of second motor generator 120.

Second inverter 220 converts a direct current supplied from battery 150 into an alternating current and supplies the alternating current to second motor generator 120. Further, second inverter 220 converts the alternating current generated by second motor generator 120 into a direct current.

Converter 200, first inverter 210, and second inverter 220 are controlled by ECU 170.

System main relay 230 is provided between battery 150 and converter 200. System main relay 230 is a relay for switching between a connected state and a disconnected state of battery 150 and the electric system. In a state where system main relay 230 is in the open state, battery 150 is disconnected from the electric system. In a state where system main relay 230 is in the closed state, battery 150 is connected to the electric system.

The state of system main relay 230 is controlled by ECU 170. For example, upon activating ECU 170, system main relay 230 is closed. When ECU 170 is to be stopped, system main relay 230 is opened.

Figure 4:
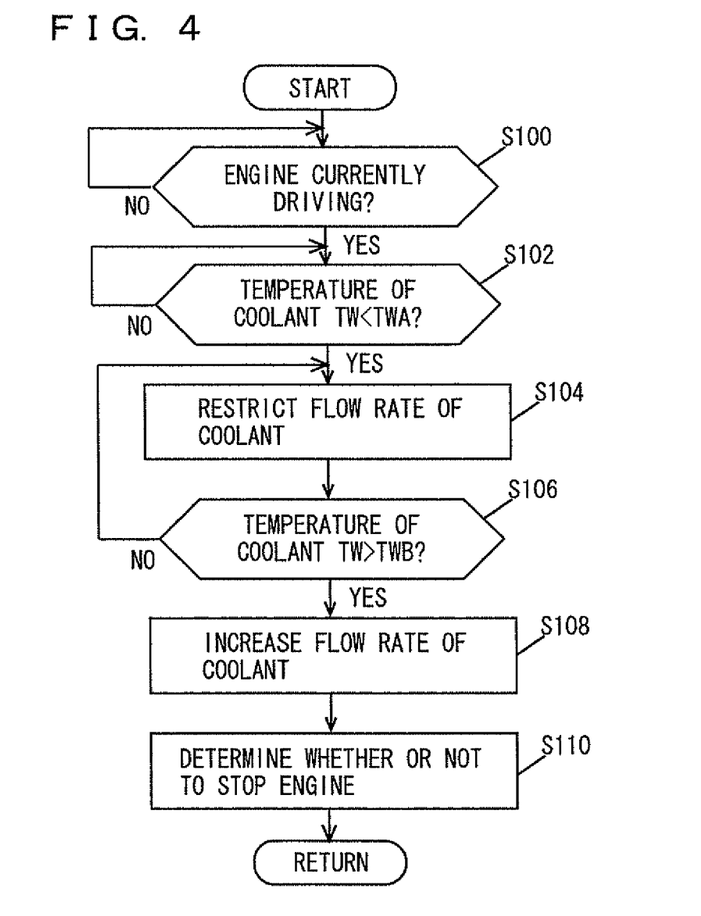
FIG. 4 is a flowchart showing the processes executed by an ECU.

With reference to FIG. 4, processes executed by ECU 170 in the present embodiment will be described. The processes described below may be executed by software, hardware, or cooperation of hardware and software.

In a step (hereinafter, the term "step" will be abbreviated as "S") 100, ECU 170 determines whether or not engine 100 is driving. If engine 100 is driving (YES in S100), the process proceeds to S102. If not so (NO in S100), the process returns to S100.

In S102, ECU 170 determines whether or not temperature TW of coolant in engine 100 is lower than threshold value TWA. If temperature TW is lower than threshold value TWA (YES in S102), the process proceeds to S104. If temperature TW is equal to or greater than threshold value TWA (NO in S104), the process returns to S102.

In S104, ECU 170 restricts (reduces) the flow rate of the coolant. For example, the flow rate of the coolant is restricted by stopping electric water pump 104 or by driving at a minimum duty ratio.

In addition to the condition that temperature TW of the coolant in engine 100 is lower than threshold value TWA, the flow rate of the coolant may be restricted if another condition is satisfied including the condition that the driving time of electric water pump 104 is longer than a predetermined time period or the condition that the number of times the electric water pump 104 is driven is greater than a predetermined number.

In S106, ECU 170 determines whether or not temperature TW of the coolant in engine 100 is higher than a predetermined temperature TWB (TWB<TWA). If temperature TW is higher than predetermined temperature TWB (YES in S106), the process proceeds to S108. If temperature TW is equal to or lower than predetermined temperature TWB (NO in S106), the process returns to S104.

In S108, ECU 170 drives the electric water pump 104 such that the flow rate of the coolant increases as compared to the case where temperature TW of the coolant in engine 100 is equal to or lower than predetermined temperature TWB. In other words, if temperature TW detected by the coolant temperature sensor 106 rises to predetermined temperature TWB, electric water pump 104 is driven so as to increase the flow rate of the coolant.

For example, electric water pump 104 is driven for only a predetermined time period at a duty ratio greater than the minimum duty ratio. Electric water pump 104 may be driven such that the flow rate of the coolant is restricted as compared to the case where temperature TW of the coolant in engine 100 is lower than threshold value TWA and such that the flow rate of the coolant increases as compared to the case where temperature TW of the coolant in engine 100 is equal to or lower than predetermined temperature TWB.

In S110, ECU 170 determines whether or not to stop engine 100 in accordance with temperature TW of the coolant detected by coolant temperature sensor 106. For example, if the condition is satisfied including at least the condition that temperature TW of the coolant to be detected by coolant temperature sensor 106 is higher than a lower limit TWC (TWC<TWB) after electric water pump 104 is driven so as to increase the flow rate of the coolant as compared to the case where temperature TW of the coolant in engine 100 is equal to or lower than predetermined temperature TWB, ECU 170 determines to stop engine 100. If engine 100 is determined to be stopped, engine 100 is stopped.

The conditions to stop the engine includes conditions which are set appropriately by the developer. Other than the condition that temperature TW of the coolant is higher than a lower limit value TWC, the condition may be that the state of charge of battery 150 is higher than a predetermined state of charge, and that a target output power determined in accordance with the accelerator position is lower than a predetermined power.

Based on the structure and the flowchart described above, operation of the hybrid vehicle in accordance with the present embodiment will be described. In the following description as one example, the operation of the hybrid vehicle after starting engine 100 will be described.

When the engine 100 is started, it is determined that engine 100 is driving (YES in S100). In this case, it is determined whether or not temperature TW of the coolant in engine 100 is lower than threshold value TWA (S102). If temperature TW rises to be equal to or greater than the threshold value TWA (NO in S100), the electric water pump 104 is driven to perform circulation of the coolant, as described above. On the other hand, if temperature TW is lower than threshold value TWA (YES in S102), the flow rate of the coolant is restricted (S104).

Figure 5:
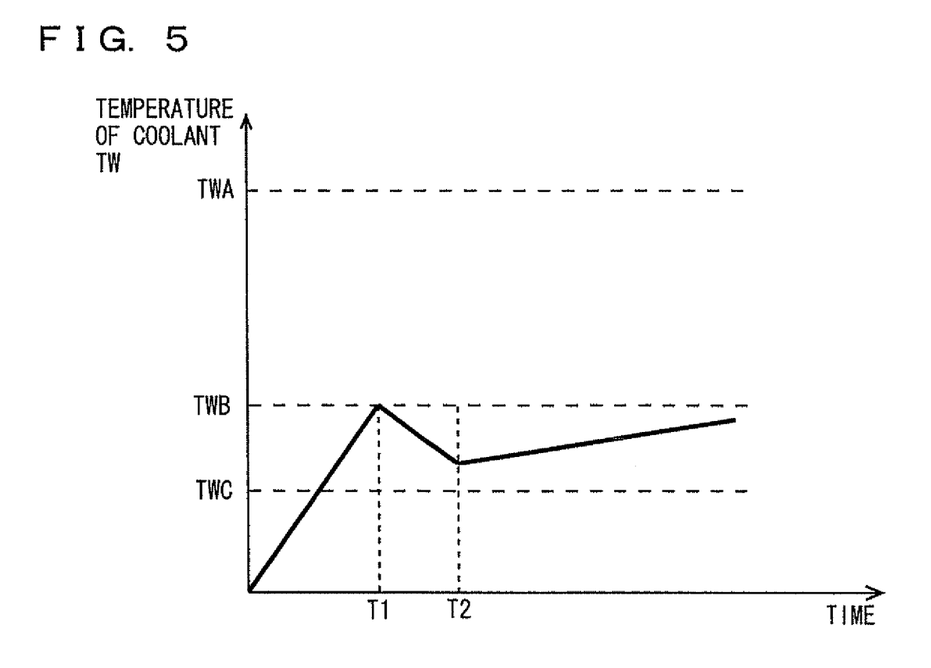
FIG. 5 is a graph showing temperature TW of coolant.

In the state where temperature TW is lower than threshold value TWA, as indicated by the time T1 in FIG. 5, the event of temperature TW of the coolant in engine 100 becoming higher than predetermined temperature TWB (YES in S106) causes electric water pump 104 to be driven so as to increase the flow rate of the coolant (S108). Thus, the difference in the temperature of the coolant in the engine 100 becomes small.

After electric water pump 104 is driven so as to increase the flow rate of the coolant, it is determined whether or not to stop engine 100 in accordance with temperature TW of the coolant at the time T2 in FIG. 5 (S110). If temperature TW of the coolant is higher than lower limit value TWC, engine 100 is allowed to stop. Thus, if another necessary condition in addition to the condition that temperature TW of the coolant is higher than lower limit value TWC is satisfied, engine 100 is stopped. Accordingly, engine 100 can be stopped after the overall temperature of the coolant becomes high enough. As a result, fine start-up performance at the time of restarting engine 100 can be ensured.

OTHER EMBODIMENT

Figure 6:
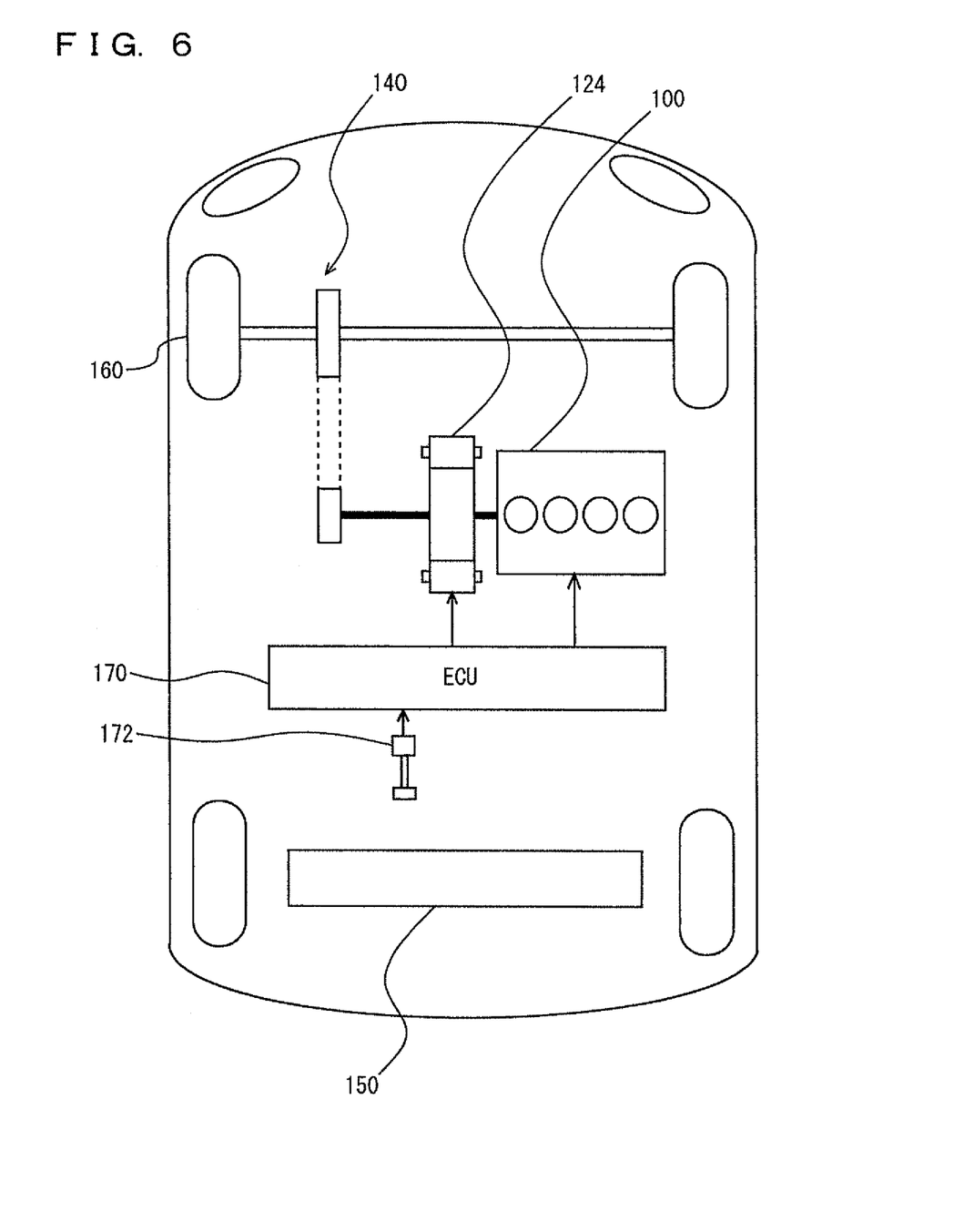
FIG. 6 is a schematic configuration diagram (part 1) showing a hybrid vehicle in another form.
Figure 7:
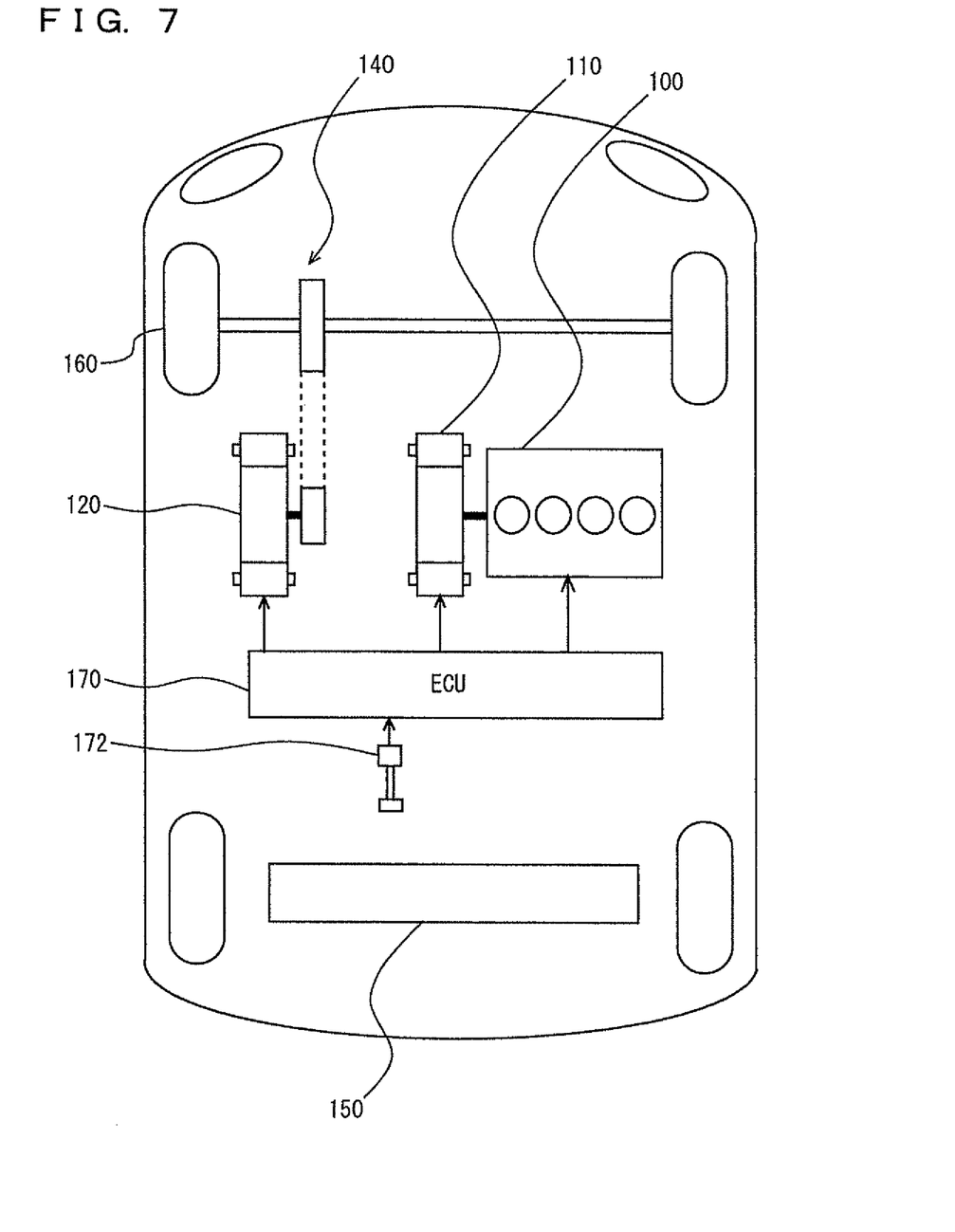
FIG. 7 is a schematic configuration diagram (part 2) showing a hybrid vehicle in another form.

As shown in FIG. 6, the present invention may be applied to a hybrid vehicle having only a motor generator 124 used mainly as a driving source, as a motor generator. As shown in FIG. 7, the present invention may be applied to a series-type hybrid vehicle using engine 100 only for driving first motor generator 110, and always using second motor generator 120 for traveling.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

100 engine,
102 radiator,
104 electric water pump,
106 coolant temperature sensor,
108 thermostat,
110 first motor generator,
120 second motor generator,
130 power split device,
140 reducer,
150 battery,
160 front wheel,
170 ECU,
172 accelerator pedal,
200 converter,
210 first inverter,
220 second inverter,
230 system main relay

The invention claimed is:

1. A control device for an engine equipped with a pump that circulates coolant, and having a flow rate of the coolant restricted, when a temperature of said coolant is lower than a threshold value, as compared to a case where the temperature of said coolant is equal to or higher than said threshold value, the control device comprising:
    a coolant temperature sensor that detects a temperature of said coolant; and
    a control unit that drives said pump so as to increase the flow rate of said coolant when the temperature detected by said coolant temperature sensor rises to a predetermined temperature lower than said threshold value, and stops said engine when a condition is satisfied including at least a condition that the temperature detected by said coolant temperature sensor after said pump is driven so as to increase the flow rate of said coolant is higher than a lower limit value lower than said predetermined temperature, in a case where the flow rate of said coolant is restricted.

2. The control device according to claim 1, wherein said control unit drives said pump for only a predetermined time period so as to increase the flow rate of said coolant.

3. A control method for an engine equipped with a pump that circulates coolant, and having a flow rate of the coolant restricted, when a temperature of said coolant is lower than a threshold value, as compared to a case where the temperature of said coolant is equal to or higher than said threshold value, the method comprising the steps of:
    detecting a temperature of said coolant;
    driving said pump so as to increase the flow rate of said coolant when the temperature detected by said coolant temperature sensor rises to a predetermined temperature lower than said threshold value, in a case where the flow rate of said coolant is restricted; and stopping said engine when a condition is satisfied including at least a condition that the temperature detected by said coolant temperature sensor after said pump is driven so as to increase the flow rate of said coolant is higher than a lower limit value lower than said predetermined temperature.

4. A control device for an engine equipped with a pump that circulates coolant, and having a flow rate of the coolant restricted, when a temperature of said coolant is lower than a threshold value, as compared to a case where the temperature of said coolant is equal to or higher than said threshold value, said engine control device comprising:

means for detecting a temperature of said coolant;

means for driving said pump so as to increase the flow rate of said coolant when the temperature detected by said coolant temperature sensor rises to a predetermined temperature lower than said threshold value, in a case where the flow rate of said coolant is restricted; and means for stopping said engine when a condition is satisfied including at least a condition that the temperature to be detected by said coolant temperature sensor after said pump is driven so as to increase the flow rate of said coolant is higher than a lower limit value lower than said predetermined temperature.

* * * * *